US011381536B2

(12) United States Patent
Chao et al.

(10) Patent No.: US 11,381,536 B2
(45) Date of Patent: *Jul. 5, 2022

(54) MOBILE NOTIFICATIONS FOR COMMENT THREADS

(71) Applicant: Dropbox, Inc., San Francisco, CA (US)

(72) Inventors: Ed Chao, Mountain View, CA (US); Joey Loi, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,621

(22) Filed: Aug. 24, 2020

(65) Prior Publication Data

US 2020/0389424 A1 Dec. 10, 2020

Related U.S. Application Data

(63) Continuation of application No. 16/022,700, filed on Jun. 29, 2018, now Pat. No. 10,778,631.

(51) Int. Cl.
*H04L 51/224* (2022.01)
*G06F 16/93* (2019.01)
(Continued)

(52) U.S. Cl.
CPC ............ *H04L 51/24* (2013.01); *G06F 16/176* (2019.01); *G06F 16/93* (2019.01); *G06F 40/169* (2020.01); *H04L 51/046* (2013.01); *H04L 51/16* (2013.01)

(58) Field of Classification Search
CPC ....... H04L 51/16; H04L 51/24; H04L 51/046; H04L 12/58; H04L 51/12; G06F 16/93;
(Continued)

(56) References Cited

U.S. PATENT DOCUMENTS 7,904,515 B2 * 3/2011 Ambati .................. G06Q 10/10
715/753
8,701,027 B2 * 4/2014 van Dantzich ......... H04L 51/24
715/768
(Continued)

OTHER PUBLICATIONS

Final Office Action from U.S. Appl. No. 16/022,700, dated Apr. 22, 2020, 33 pages.
(Continued)

*Primary Examiner* — James N Fiorillo
(74) *Attorney, Agent, or Firm* — Fenwick & West LLP

(57) ABSTRACT

A document system tracks activity within comment threads associated with portions of a stored document. When activity is detected within the document, the document system generates a corresponding notification for display by a client device within a notification interface. The notification interface displays one or more notifications, each associated with activity in documents stored by the document system, and orders the notifications by document, by date, by filter, or any other suitable factor. The user may assign a priority to each document or folder such that notifications associated with documents or folders with a higher priority are displayed before those associated with a lower priority. The notifications may include portions of comment threads, and a user can reply to a comment thread via a response element of the notification interface. The user's reply is incorporated into the comment thread and stored by the document system.

20 Claims, 16 Drawing Sheets

(51) Int. Cl.
*G06F 16/176* (2019.01)
*G06F 40/169* (2020.01)
*H04L 51/046* (2022.01)
*H04L 51/00* (2022.01)

(58) Field of Classification Search
CPC .... G06F 16/176; G06F 40/169; G06F 40/197; G06F 8/71
USPC ........................................................ 709/206
See application file for complete search history.

(56) References Cited

U.S. PATENT DOCUMENTS

| | | | | |
|---|---|---|---|---|
| 8,996,985 | B1* | 3/2015 | Johnston | G06F 40/166 715/230 |
| 9,753,921 | B1* | 9/2017 | DeVincenzi | G06F 40/134 |
| 9,774,561 | B1* | 9/2017 | Rapp | H04L 51/063 |
| 10,126,927 | B1* | 11/2018 | Fieldman | G06Q 10/107 |
| 10,489,492 | B2 | 11/2019 | Bhargava | |
| 2003/0163537 | A1* | 8/2003 | Rohall | H04L 51/16 709/206 |
| 2006/0053195 | A1* | 3/2006 | Schneider | H04L 67/26 709/204 |
| 2006/0053380 | A1* | 3/2006 | Spataro | G06Q 10/10 709/204 |
| 2012/0226806 | A1* | 9/2012 | Knight | G06F 9/4843 709/224 |
| 2013/0185657 | A1* | 7/2013 | Gunawardena | G06F 16/48 715/753 |
| 2013/0191720 | A1* | 7/2013 | Simons | G06V 10/22 715/234 |
| 2014/0096033 | A1* | 4/2014 | Blair | H04L 51/36 715/752 |
| 2014/0281870 | A1 | 9/2014 | Vogel et al. | |
| 2015/0100503 | A1* | 4/2015 | Lobo | G06Q 10/103 705/301 |
| 2016/0021179 | A1* | 1/2016 | James | H04N 21/252 709/204 |
| 2017/0019474 | A1* | 1/2017 | Tevosyan | H04L 67/1095 |
| 2017/0063772 | A1* | 3/2017 | Bapat | G06Q 10/10 |
| 2017/0195266 | A1* | 7/2017 | Moyers | H04L 65/608 |
| 2017/0214643 | A1* | 7/2017 | Shukla | G06Q 10/101 |
| 2017/0255604 | A1* | 9/2017 | Wilde | G06Q 10/103 |
| 2017/0257406 | A1* | 9/2017 | Wilde | G06Q 10/00 |
| 2017/0329467 | A1* | 11/2017 | Chen | H04L 67/325 |
| 2018/0012032 | A1* | 1/2018 | Radich | H04L 9/30 |
| 2018/0060347 | A1 | 3/2018 | Bhattacharjee et al. | |
| 2018/0091463 | A1* | 3/2018 | Yang | H04L 51/046 |
| 2018/0101297 | A1* | 4/2018 | Yang | H04M 1/72403 |
| 2018/0123815 | A1* | 5/2018 | Milvaney | G06F 40/166 |
| 2018/0165002 | A1* | 6/2018 | Yang | G06F 3/04883 |
| 2018/0191645 | A1* | 7/2018 | Cacioppo | H04L 67/06 |
| 2018/0191805 | A1* | 7/2018 | Hurwitz | H04L 67/26 |
| 2019/0342252 | A1* | 11/2019 | Dascola | G06F 3/0482 |

OTHER PUBLICATIONS

International Appl No. PCT/IB2019/051268, International Search Report and Written Opinion dated Jun. 4, 2019, 10 pages.
Ioannou A., et al., "Wiki and threaded discussion for online collaborative activities: Students' perceptions and use," Aug. 2009, Journal of Emerging Technologies in Web Intelligence, vol. 1, No. 1, 11 Pages.
Non-Final Office Action from U.S. Appl. No. 16/022,700, dated Nov. 12, 2019, 26 pages.
Notice of Allowance from U.S. Appl. No. 16/022,700, dated Jul. 9, 2020, 20 pages.
Anonymous: "Jelly Bean | Android Developers," May 14, 2018, XP055891177, Retrieved from the Internet: URL:https://web.archive.org/web/20180514074357/https://developer.android.com/about/versions/jelly-bean [retrieved on Feb. 14, 2022], 12 pages.
Communication Pursuant to Article 94(3) EPC for European Application No. 19711704.7 dated Feb. 18, 2022, 9 pages.
Tiago M., "Widget for Facebook for Android-APK Download 1," Aug. 21, 2015, XP055891076, Retrieved from the Internet:URL:https://m.apkpure.com/widget-for-facebook/com.splashpadmobile.mobiletogo [retrieved on Feb. 14, 2022], 8 pages.

* cited by examiner

MOBILE NOTIFICATIONS FOR COMMENT THREADS

CROSS REFERENCE TO RELATED APPLICATIONS

This application is a continuation of U.S. application Ser. No. 16/022,700, filed Jun. 29, 2018, now U.S. Pat. No. 10,778,631, which is incorporated by reference in its entirety.

TECHNICAL FIELD

The disclosed embodiments generally relate to document editing, and specifically to comment thread modification in a notification interface.

BACKGROUND

Online sharing and collaboration of documents is typically provided by a network-based file sharing computer system that allows multiple users to access and edit the files. Generally, documents are created and edited by a specific type of native application, such as a word processor or spreadsheet application. Many such applications provide support for co-editing a single document among many users.

When collaborating on a document, different users may work on the single document at different times throughout the day instead of working simultaneously. Because not all users are looking at the document at the same time, a user who needs feedback from a team member before being able to continue working on the document may leave a new comment on the document and then be forced to wait for feedback from the team member, which decreases workflow efficiency. In addition, many users prefer to edit documents from a desktop or a laptop with large screen and physical keyboard over a mobile device which has a limited display area and a virtual keyboard. As a result, the team member who needs to respond to the new comment may choose not to respond until the team member has access to a desktop or laptop, causing further delay.

Although it may be difficult to do substantial editing on a document from mobile devices, mobile devices can be a useful tool for responding to comments. Because mobile devices are portable and users check their mobile devices frequently, mobile devices can be used to respond quickly to comments made by other team members, allowing the other team members (who otherwise may be waiting for such feedback) to continue working. By providing a convenient interface for the mobile device that allows easy navigation between comment threads and editing comment threads from a notification interface, users can respond to comments more quickly, workflow productivity can increase, and the time to complete a collaborative project may decrease.

SUMMARY

A document system stores a collaborative document and tracks activity within comment threads associated with portions of the document. When activity within a comment thread associated with a portion of the document is detected, the document system generates a corresponding notification for display by a client device. The client device presents the notification, which identifies the document, the comment thread, and the detected activity. The notification is presented within a notification interface of the client device and the notification interface may present notifications associated with activity corresponding to additional documents stored by the document system.

A user may interact with the notification displayed within the notification interface of the client device. For instance, the notification interface may include a response interface element that is configured to receive textual input from the user, such as a reply to the identified activity within the comment thread. The client device can provide the textual input to the document system, which can store the textual input as a comment within the comment thread.

The notifications displayed in the notification interface of the client device may be organized according to the user's preference. For instance, the notifications can be grouped and presented based on the documents associated with the notifications, based on a priority specified by the user, based on a ranking generated by the document system (for instance, based on information within a user profile), based on a user's past interactions with the documents or other users associated with the notifications, and based on a notification type. For example, notifications that are associated with documents of high importance can be displayed before notifications associated with documents of lower importance. In other embodiments, the notifications can be organized based on users, folders, tags, tasks, or dates associated with the notifications.

It should be noted that while reference is made herein to mobile device notifications, the notification concepts described herein can be implemented in any context including non-mobile contexts (e.g., within a web browser on a desktop computer).

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
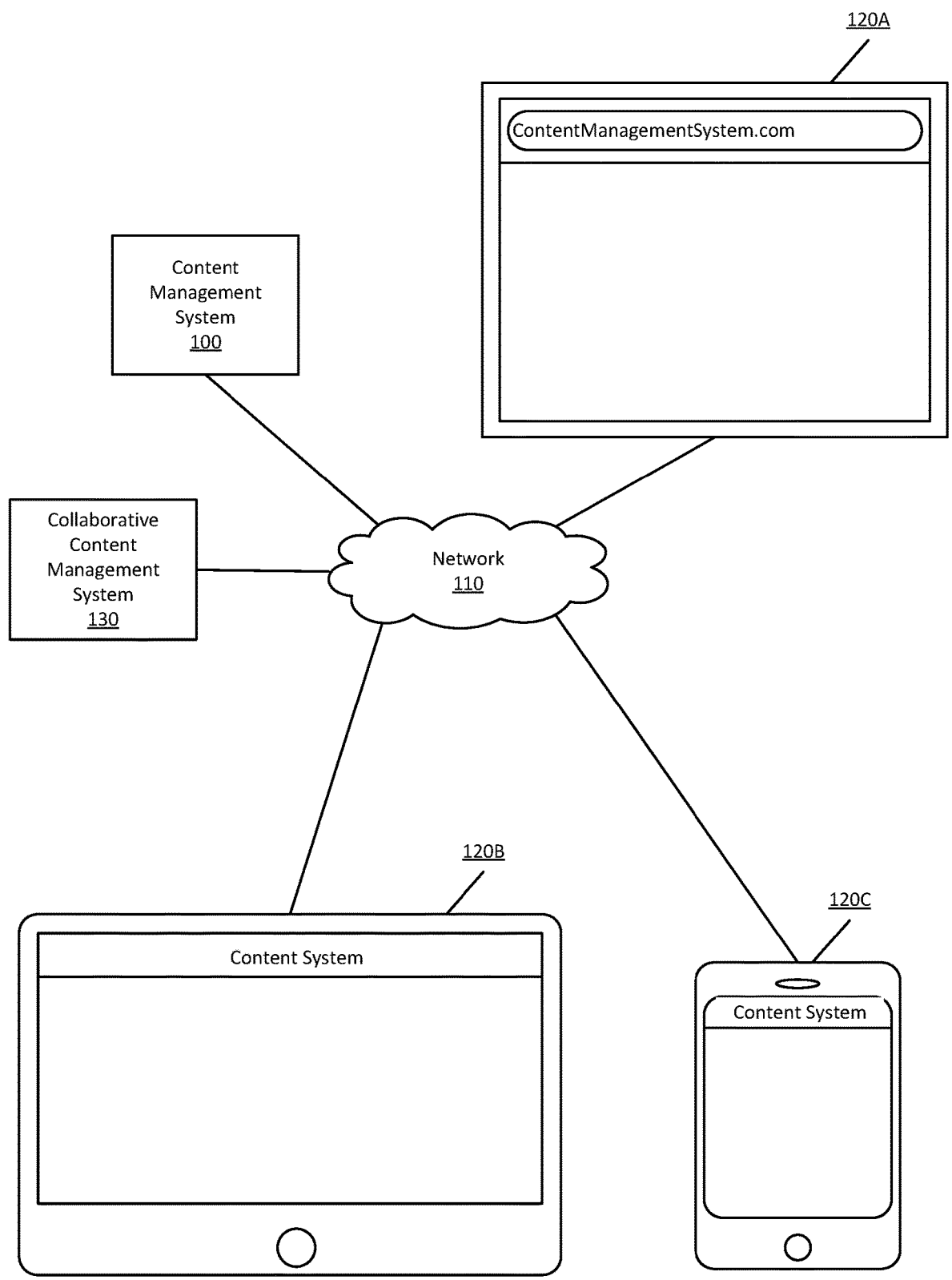
FIG. 1 shows a diagram of a system environment of a content management system and a collaborative content management system, according to example embodiments.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some embodiments, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some embodiments, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
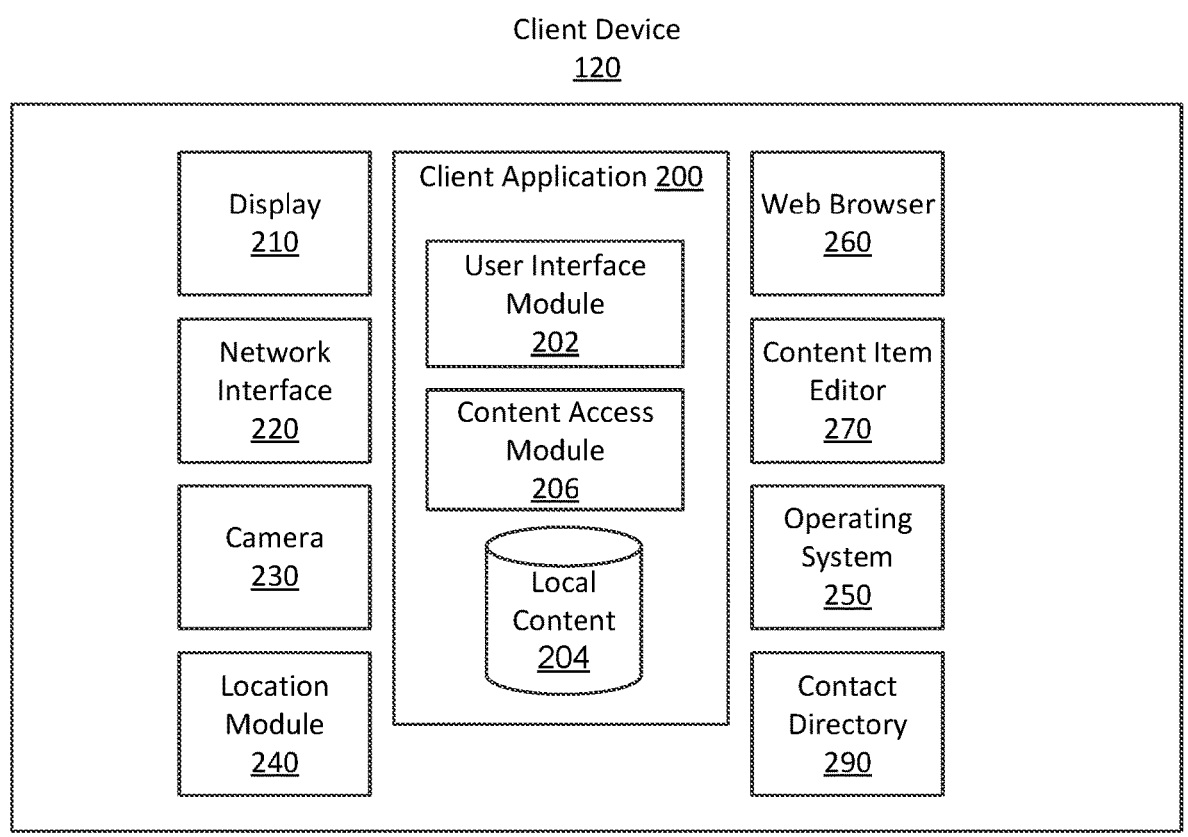
FIG. 2 shows a block diagram of components of a client device, according to example embodiments.

FIG. 2 shows a block diagram of the components of a client device 120 according to some embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
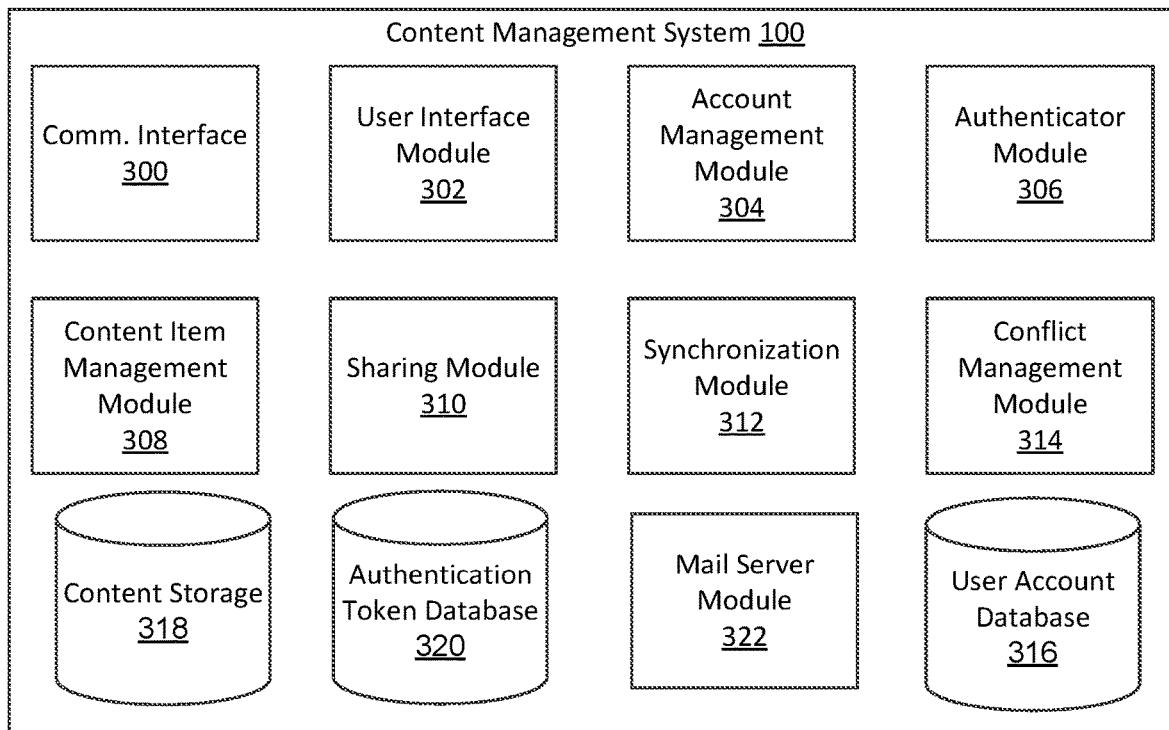
FIG. 3 shows a block diagram of a content management system, according to example embodiments.

FIG. 3 shows a block diagram of the content management system 100 according to some embodiments. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
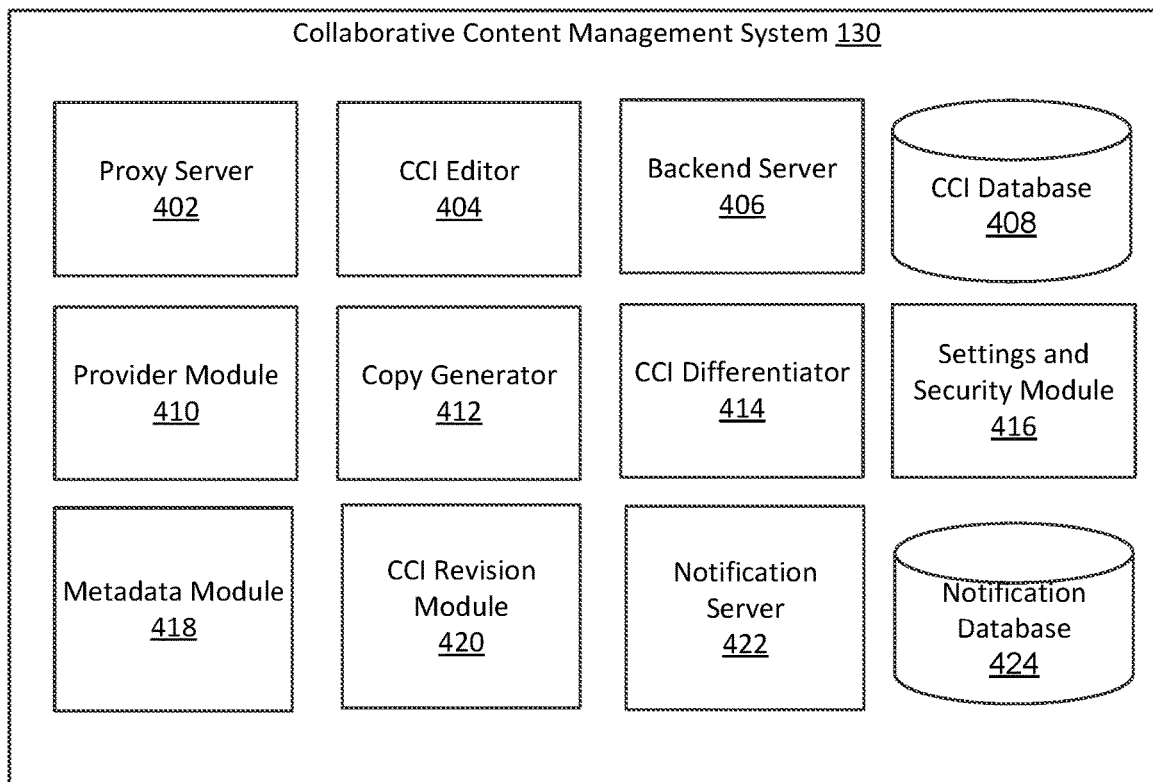
FIG. 4 shows a block diagram of a collaborative content management system, according to example embodiments.

FIG. 4 shows a block diagram of the collaborative content management system 130, according to some embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In alternative embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some embodiments, the access module can also provide the access link to user accounts via the network 110, while in other embodiments the access link can be provided or made accessible to a user account and is accessed through a user account via the client device. In some embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

New Comment Navigation

Because the display screen of a mobile device may be small, it can be useful to implement a comment interface that displays one comment thread at a time in conjunction with showing a portion of a document corresponding to a displayed comment thread in a document interface. For instance, the comment interface may be overlaid on top of the document interface, the document interface can be shrunk and displayed above the comment interface, and the like. Throughout the course of a project, there may be many comments in many comment threads within a document, and it can save time to allow the user to navigate through only the comment threads including new comments that have been added since the last time the user accessed the document.

FIG. 5A through 5D illustrate the navigation of new comments in a collaborative content item, according to example embodiments. The collaborative content item 500 is a document that can be edited or modified to include different types of data such as text data, image data, video data, URLs, structured data, unstructured data, and the like. The collaborative content item 500 may be accessed and edited by users who are invited by an owner of the collaborative content item to view or edit the collaborative content item, respectively. To add a comment thread to the collaborative content item, a portion of data in the collaborative content item is selected, and a comment that is related to the selected portion of data is added. As used herein, a comment thread is a collection of comments related to the portion of the document made by users of the collaborative content item. As used herein, a comment is content (such as text or images) entered by an author in association with a portion of a document, for instance within a comment interface different from a document interface. The comment thread may be modified by adding a new comment or a response to an existing comment to the comment thread. In a collaborative content item, there may be a plurality of comment threads, each associated with a different portion of data in the collaborative content item 500. When a user accesses a collaborative content item 500 with a new or modified comment thread, the document interface may initially display the collaborative content item 500 within a document interface without displaying a dedicated comment interface. The portions of data within a document corresponding to comment threads may be indicated within the document interface using one or more visual features to differentiate the portions from portions of the collaborative content item 500 that are not associated with a comment thread. For instance, portions of the collaborative content items associated with comment threads can be underlined, highlighted, bolded, indicated using a different font color, and the like. To further differentiate comment threads that contain at least one new comment from comment threads without new activity, portions of the collaborative content item that correspond to a comment thread that includes at least one new comment may be indicated using one or more visual features not included in portions of the collaborative content item corresponding to comment threads without new activity.

Figure 5A:
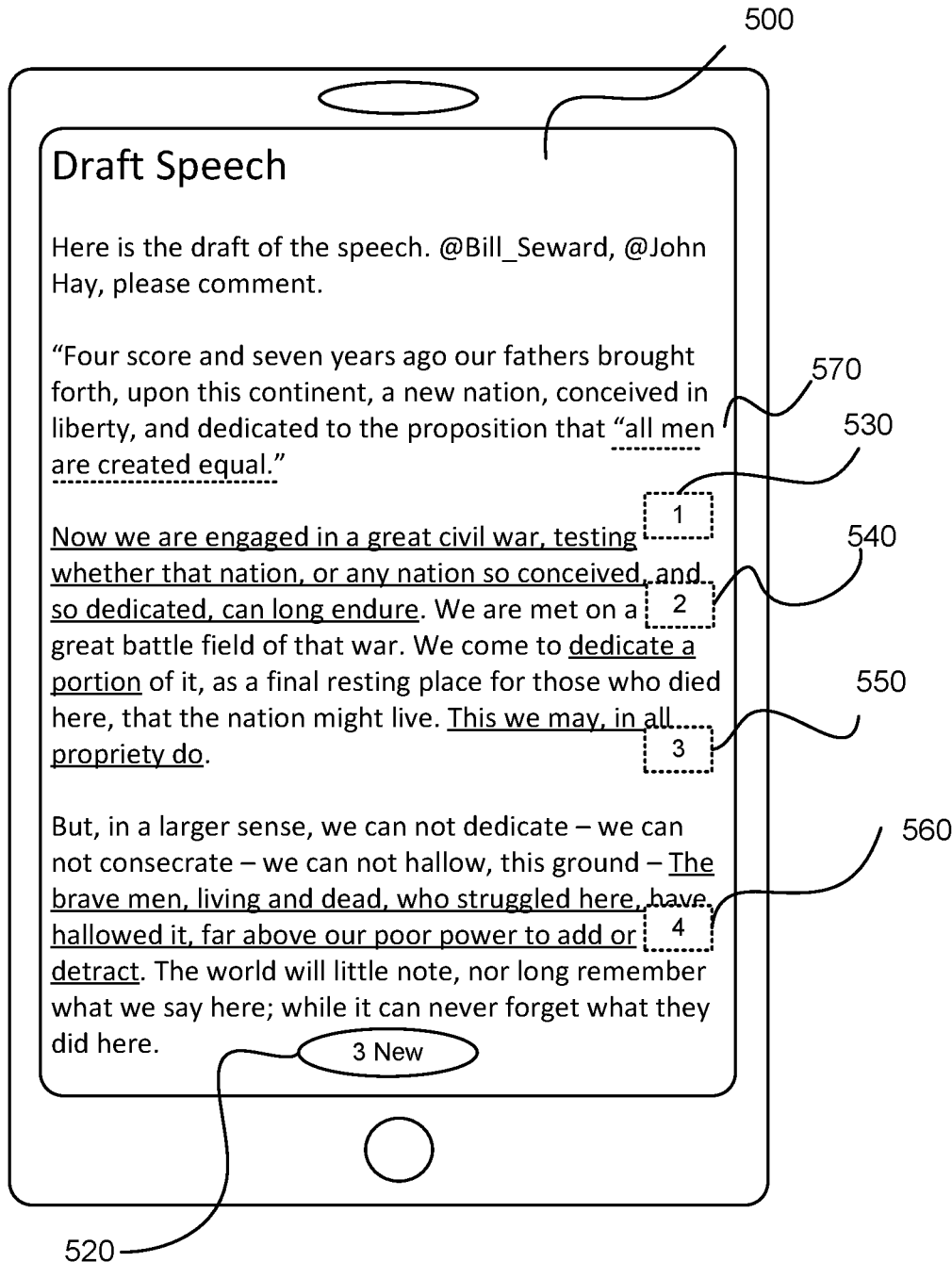
FIG. 5A through 5D illustrate the navigation of new comments in a collaborative content item, according to example embodiments.

Each comment thread of the plurality of comment threads may be assigned an index that represents an order of the comment threads, and the index may be displayed with a portion of the collaborative content item associated with the comment thread. In the example of FIG. 5A, the index is displayed by overlaying numerical text over the collaborative content item next to the portion of the collaborative content item associated within the comment thread. In some example embodiments, the index is assigned based on the position of the portion of the collaborative content item corresponding to a comment thread relative to the top of the collaborative content item 500. In the embodiments included herein, each comment thread (such as comment thread 530) is associated with an index (such as the number "1"), though in other embodiments, the numeric comment thread display elements are not included and instead, comment threads are indicated by other means (such as underlining, bold font, italicized font, highlighted text, etc.)

As shown in FIGS. 5A through 5D, there are four comment threads: a first comment thread 530, a second comment thread 540, a third comment thread 550, and a fourth comment thread 560. In the example shown in FIG. 5A, the text "Now we are engaged in a great civil war . . . can long endure" is associated with the first comment thread 530 assigned to the index "1" because the text is closest to the top of the document. However, if a new comment thread corresponding to the text 570, "all men are created equal," is added, the new comment thread may be assigned to the index "1" because the position of the text 570 is now closest to the top of collaborative content item 500. Accordingly, the indexes associated with the remaining comment threads are incremented by one (e.g., the index assigned to the first comment thread 530 is updated to "2"). In the example shown in FIG. 5A, the order of the comment threads are displayed on the document interface, but in other examples, the order information may be maintained and updated by the collaborative content management system but not displayed to the user in the document interface.

In other example embodiments, the order of the comment threads may be based on the position of the comment threads relative to the position of the user's last edit or last viewed word in the document. The collaborative content management system may keep track of the user's cursor and/or track the position in the collaborative content item that the user interacts with before exiting the client application. The order of the comment threads that include a new comment may be assigned such that a comment thread corresponding to a portion of the collaborative content item that is closest in position to the tracked position is assigned the index "1." The remaining comment threads are indexed sequentially according to position after the tracked position within the collaborative content item until the bottom of the document is reached, after which the indexing of comment threads continues from the start of the collaborative content item.

In the example shown in FIG. 5A, a new comment interface element 520 indicates that there are 3 new comments since the user last viewed the collaborative content item 500. The first comment thread 530 has a first new comment, the third comment thread 550 has a second new comment, and the fourth comment thread 560 has a third new comment. The new comment interface element 520 indicating the number of new comments may be located at the bottom of the document interface 500 as in FIG. 5A or may be located at any other location on the document interface 500. The new comment interface element 520 may be movable, and the user may be able drag and drop the new comment interface element 520 to a desired position within the document interface 500. The new comment interface element 520 may be locked into the desired position on the document interface 500 and may not move when the user looks at a different portion of the collaborative content item 500 than what is initially displayed. For example, the user may scroll to a lower portion of the collaborative content item by swiping the touch screen of the mobile device, and the new comment interface element 520 may remain at the bottom of the document interface 500 as shown in FIG. 5A.

Figure 5B:
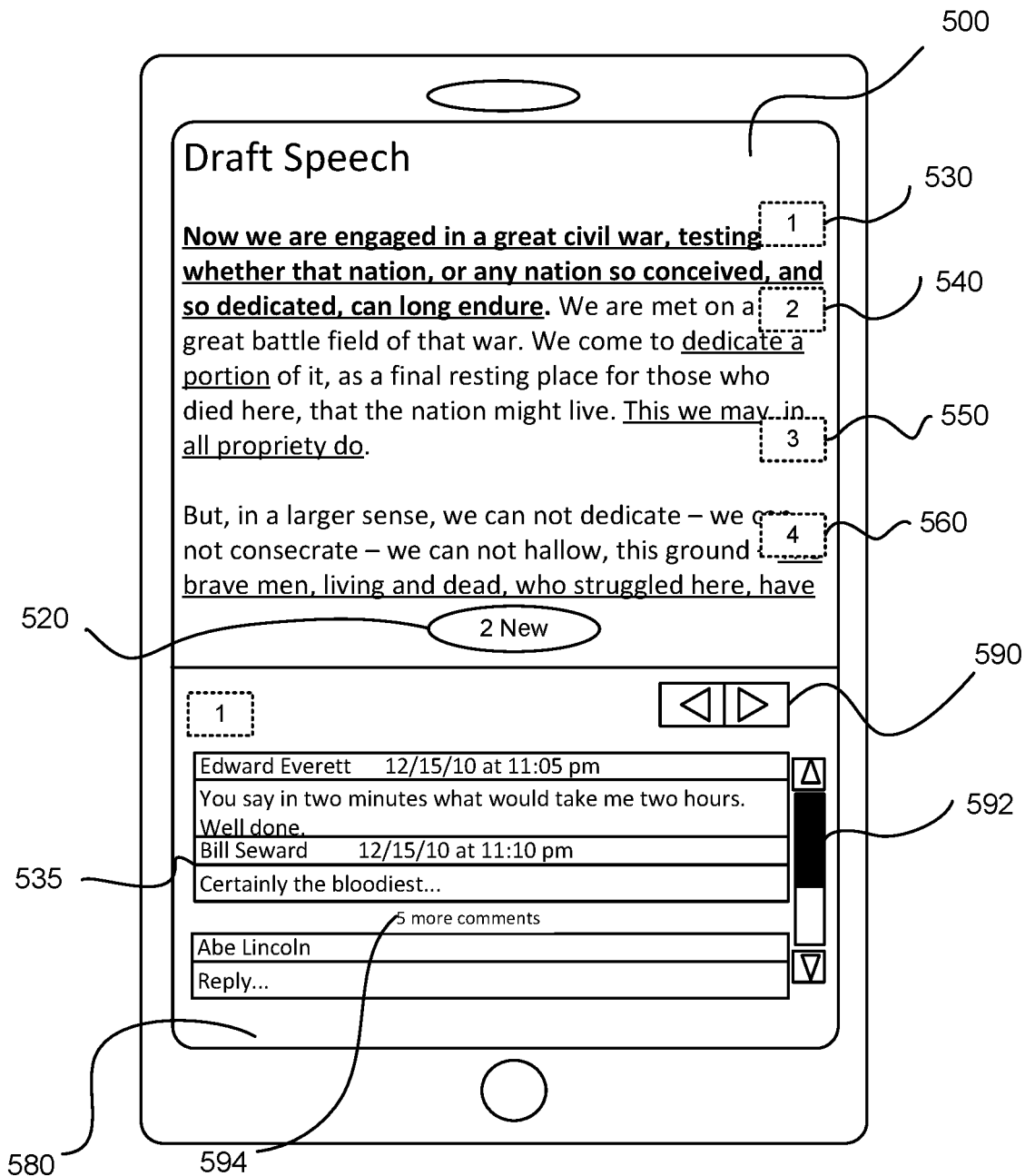

Turning to FIG. 5B, when a user interacts with the new comment interface element 520, the comment interface 580 may appear over the document interface 500 to display the first new comment 535. The user may interact with the new comment interface element 520 by, for instance, tapping on the display screen of the mobile device or may use a voice command function of the mobile device to access the new comment interface element 520. When the first new comment 535 that is included in the first comment thread 530 is displayed, the new comment interface element 520 is updated from "3 new" to "2 new" as shown in FIG. 5B.

In alternative example embodiments, the new comment interface element 520 displays a number of new comments within the collaborative content item (as opposed to the number of comment threads that include new comment activity). Continuing with such embodiments, suppose two new comments are made on the first comment thread 530. In this case, when the user interacts with the new comment interface element 520, the two new comments are displayed in the comment interface 580 and the new comment interface element 520 is updated from "3 new" to "1 new." Returning to FIG. 5B, the comment interface 580 may be overlaid on top of the document interface 500 and displayed along with a portion of the collaborative content item 500 corresponding to the first comment thread 530 (the text "Now we are engaged . . . "). The first comment thread 530 may include a plurality of comments, and there may not be enough space to display all of the comments simultaneously within the comment interface 580. As such, the collaborative content management system may select a subset of the plurality of comments to display. In the example shown in FIG. 5B, the first two comments of the comment thread are displayed and the remaining 5 comments are condensed into an additional comment interface element 594. The user may click on the additional comment interface element 594 which is represented by the text "5 more comments" to display the 5 additional comments within the comment interface 580 (e.g., the user may have to scroll down the displayed comments to see the 5 additional comments).

In example embodiments, the size of the comment interface 580 may be adjusted. For instance, the user may drag the top edge of the comment interface 580 upward to increase the size of the comment interface 580 or drag the top edge of the comment interface 580 downward to decrease the size of the comment interface. The user may also interact with other resizing display elements (not shown in FIG. 5B). The user may enlarge the size of the comment interface 580 such that more of the first comment thread 530 may be displayed at a time. Since the display screen of the mobile device has a fixed size, the size of the document interface is also adjusted to compensate for the change in the size of the comment interface. When the size of the comment interface 580 is increased, the size of the document interface 500 is made smaller to compensate. Similarly, when the size of the comment interface 580 is decreased, the size of the document interface 500 is increased. With the change in the size of the document interface 500, the visual features of the content displayed within the document interface 500 may be adjusted as well. If the collaborative content item contains only text, the font size of the text displayed in the document interface 500 may be adjusted. If the collaborative content item also includes other types of data such as images, the size of the images in the collaborative content item may be scaled according to the adjustment. Instead of changing the visual features of the content displayed within the document interface, a smaller portion of the collaborative content item may be displayed within the document interface 500.

The comment interface 580 may have comment navigation arrows 590. The comment navigation arrows 590 allows the user to navigate through the comment threads within the collaborative content item (as opposed to interacting with the new comment interface element, which allows a user to navigate through comment threads with new comment activity). The comment navigation arrows 590 will be discussed in detail with respect to FIG. 6A through 6C.

Figure 5C:
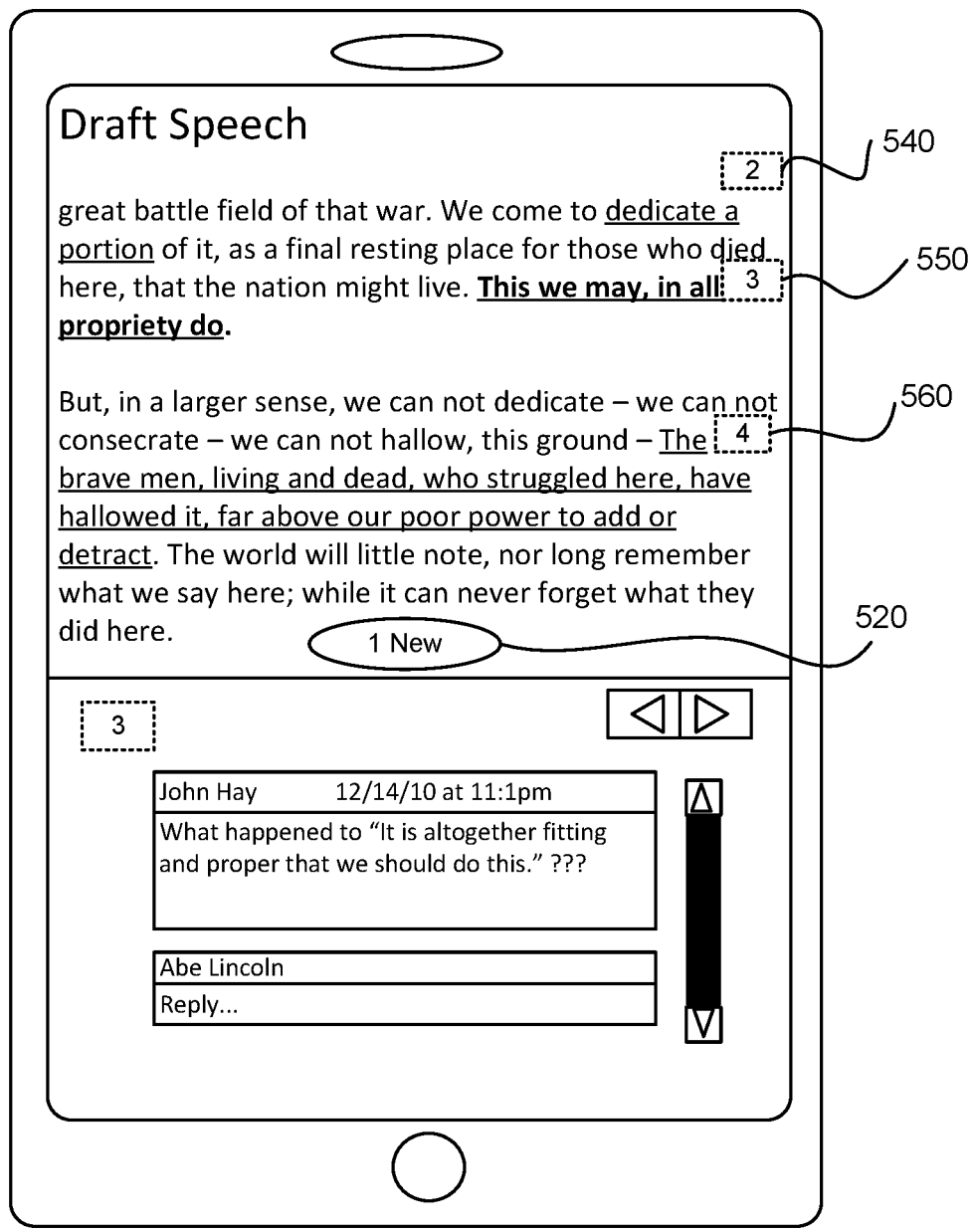

As shown in FIG. 5C, when the user interacts with the new comment interface element 520 a second time, the comment interface 580 is updated to display the second new comment, which is included in the third comment thread 550. In the example shown in FIG. 5A through 5D, the second comment thread 540 does not include new comment activity, and accordingly, after displaying the first new comment 535 in the first comment thread 530 within the comment interface 580, interacting with the new comment interface element 520 causes the second comment thread 540 to be skipped and the third comment thread 550 to be displayed within the comment interface.

In example embodiments, the user may view a new comment but may wish to return to the new comment at a later time after viewing the new comment. Although not shown in FIG. 5C, the comment interface 580 may have an option to mark the second new comment as new after the user has viewed the second new comment. When the user marks the second new comment as new, the number of new comments is incremented by one and the new comment interface element 520 reflects the update and displays "2 new" instead of "1 new."

Figure 5D:
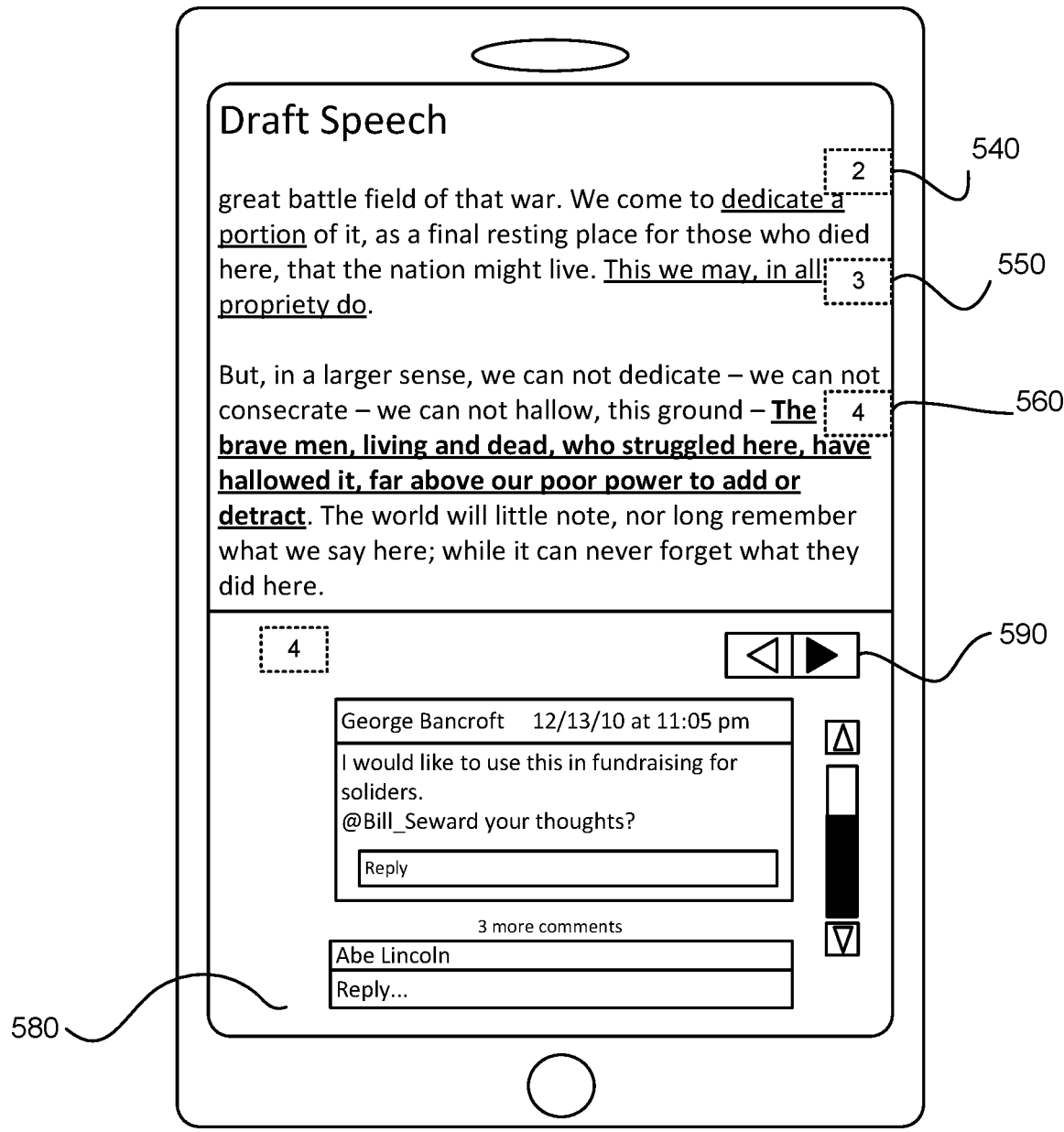

When the new comment interface element 520 includes an indication that only one comment thread associated with new comment activity remains, interacting with the new comment interface element 520 causes the new comment interface element 520 to disappear from the document interface 500, as shown in FIG. 5D. The comment interface 580 displays a fourth comment thread 560 which includes the third new comment.

Although the new comment interface element 520 is no longer displayed because all the new comments have been read by the user, the user may still navigate through all the comment threads using the comment navigation arrows 590 as described below.

Comment Thread Navigation User Interface

Figure 6A:
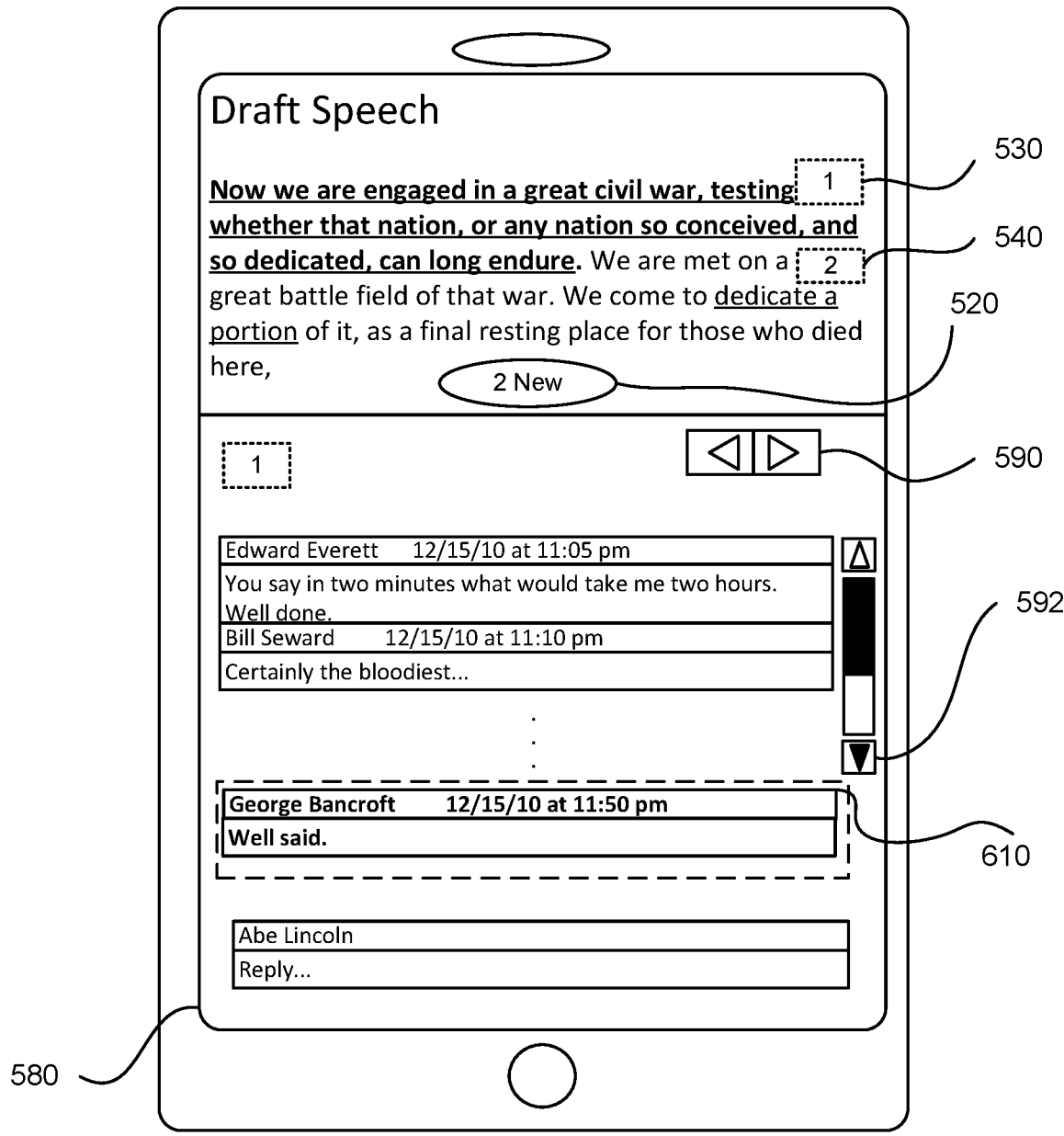
FIG. 6A through 6C illustrate the navigation between comment threads, according to example embodiments.
Figure 6B:
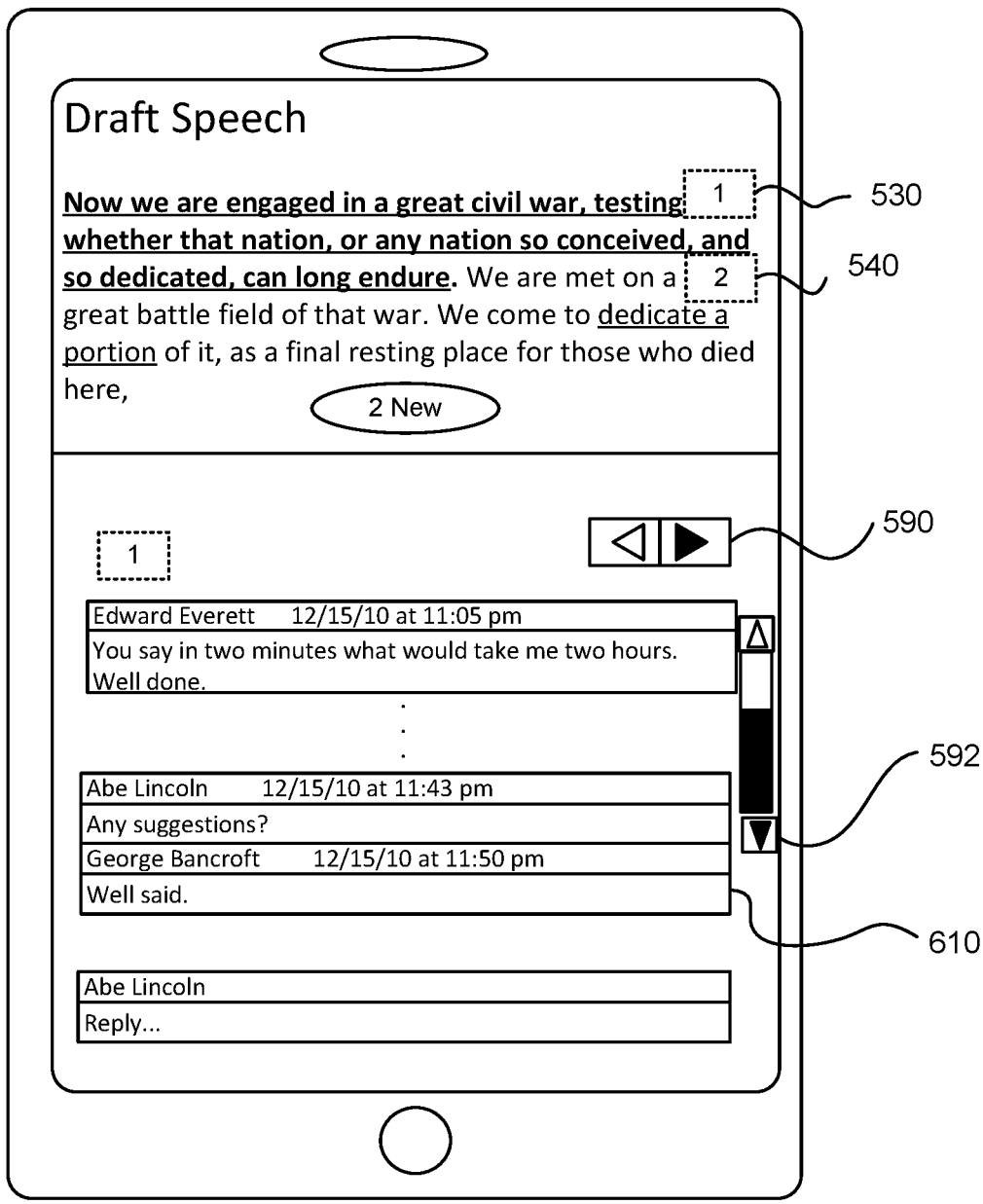
Figure 6C:
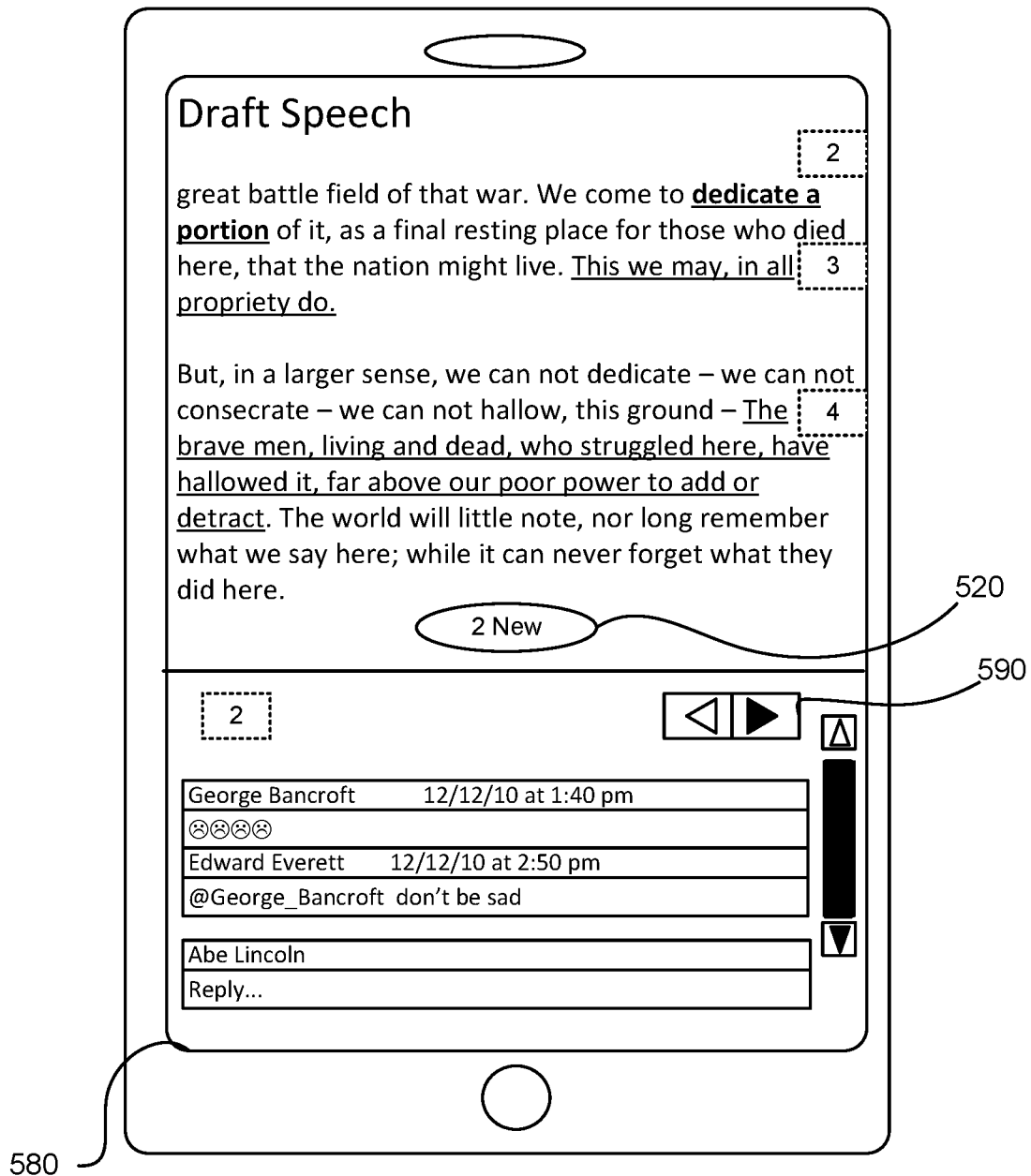

FIG. 6A through 6C illustrate the navigation between comment threads, according to example embodiments. As mentioned above, the comment interface 580 may have comment navigation arrows 590 to allow the user to search through all the comment threads. The collaborative content management system 130 may order the comment threads, and the user may view different comment threads in order using the comment navigation arrows 590. The order of the comment threads may be based on the position of the portions of the collaborative content item corresponding to the comment threads. As discussed above, the order may be based on the position relative to the top of the collaborative content item, may be based on reading direction (e.g., right to left for items in the same line and top to bottom for items not in the same line), or may be based on the position of the user's last edit or last viewed word in the collaborative content item. Each comment thread of the plurality of comment threads may be assigned an index that represents the order of the comment threads.

In example embodiments, the collaborative content management system 130 may order a subset of comment threads instead of all the comment threads. The subset of comment threads may be selected based on filtering criteria selected by the user. For example, the user may only wish to view the comment threads that the user previously edited. Similarly, the user may wish to view comment threads that were edited by a particular user of the team, comment threads that the user previously viewed, comment threads associated with particular document portions, comment threads associated with a particular subject matter, and the like. In such embodiments, the user can navigate between only the subset of comment threads (e.g., all comment threads in which the user has previously edited) as opposed to all comment threads in the collaborative content item.

The comment navigation system described herein can beneficially allow for a user to navigate between comment threads, which is different from comment navigation in traditional word processing applications. Typical comment navigation in such applications involves navigating through individual comments one at a time instead of through comment threads. By allowing navigation through comment threads, the time it takes for a user to review comments in a collaborative content item may decrease, it may be easier for the user to find a particular comment, and the user's experience with navigating through a comment interface (particularly a mobile comment interface) may improve.

In FIG. 6A, the first comment thread 530 is displayed in the comment interface 580, and the first comment thread 530 includes a first new comment 610. A first subset of the plurality of comments in the first comment thread 530 are selected and displayed in the comment interface 580. The first subset of the plurality of comments in the first comment thread 530 includes the first two comments of the first comment thread 530 and the first new comment 610. In the various embodiments, the first new comment 610 may be visually distinguishable from the other comments in the first comment thread 530. In the example shown in FIG. 6A, the first new comment 610 has bolded font and is surrounded by a box in order to distinguish it from comments that aren't new. In other examples, the first new comment 610 may be highlighted and/or may be displayed in a different font color.

In FIG. 6B, a different subset of comments within the first comment thread 530 is displayed in the comment interface 580. The user may interact with the scroll bar 592 in a vertical direction or swipe upwards/downwards to view the different subset of comments (e.g., scrolling up/down). In FIG. 6B, the first new comment 610 is not visually distinguishable from the other comments in the first comment thread 530. The visual features applied to the first new comment 610 in FIG. 6A may fade and disappear over time (e.g., 3 seconds) or after a user first views the first new comment, after which the first new comment 610 may look like the other comments in the first comment thread 530.

In FIG. 6C, the second comment thread 540 is displayed in the comment interface 580. The second comment thread 540 immediately follows the first comment thread 530 in the ordered set of comments and is accessed by using the comment navigation arrows 590. For instance, when the comment interface 580 displays the first comment thread 530 as shown in FIG. 6B, the user may interact with the right comment navigation arrow 590 to view the second comment thread. In other example embodiments, the user may request to view the second comment thread by swiping, scrolling, or otherwise interacting with the comment interface 580 in a horizontal direction. Responsive to the user's interaction with the comment interface 580, the comment interface 580 is updated to display the second comment thread 540 and the document interface displays a portion of the collaborative content item that corresponds to the second comment thread 540.

In alternative example embodiments, when the comment interface 580 displays the first comment thread 530 as shown in FIG. 6B, the user may interact with the left comment navigation arrow 590 to view a preceding comment thread. Since there are no comment threads that precede the first comment thread, the comment interface 580 may "wrap around" the comment threads and display the last comment thread (e.g., the comment thread with the highest index).

In the example shown in FIG. 6C, the second comment thread 540 does not include a new comment. Therefore, when the user requests the display of the second comment thread 540, the count of new comments displayed within the new comment interface element 520 remains unchanged. However, if the second comment thread 540 were to include a new comment, the new comment interface element 520 would be updated from "2 New" to "1 New." It should be noted that the comment navigation system described herein can beneficially allow for a user to navigate within a comment thread using an interaction associated with a first direction (e.g., swiping up and down) while allowing the user to navigate between comment threads using an interaction associated with a second direction (e.g., swiping left and right, selecting the left and right comment navigation arrows 590).

Figure 7:
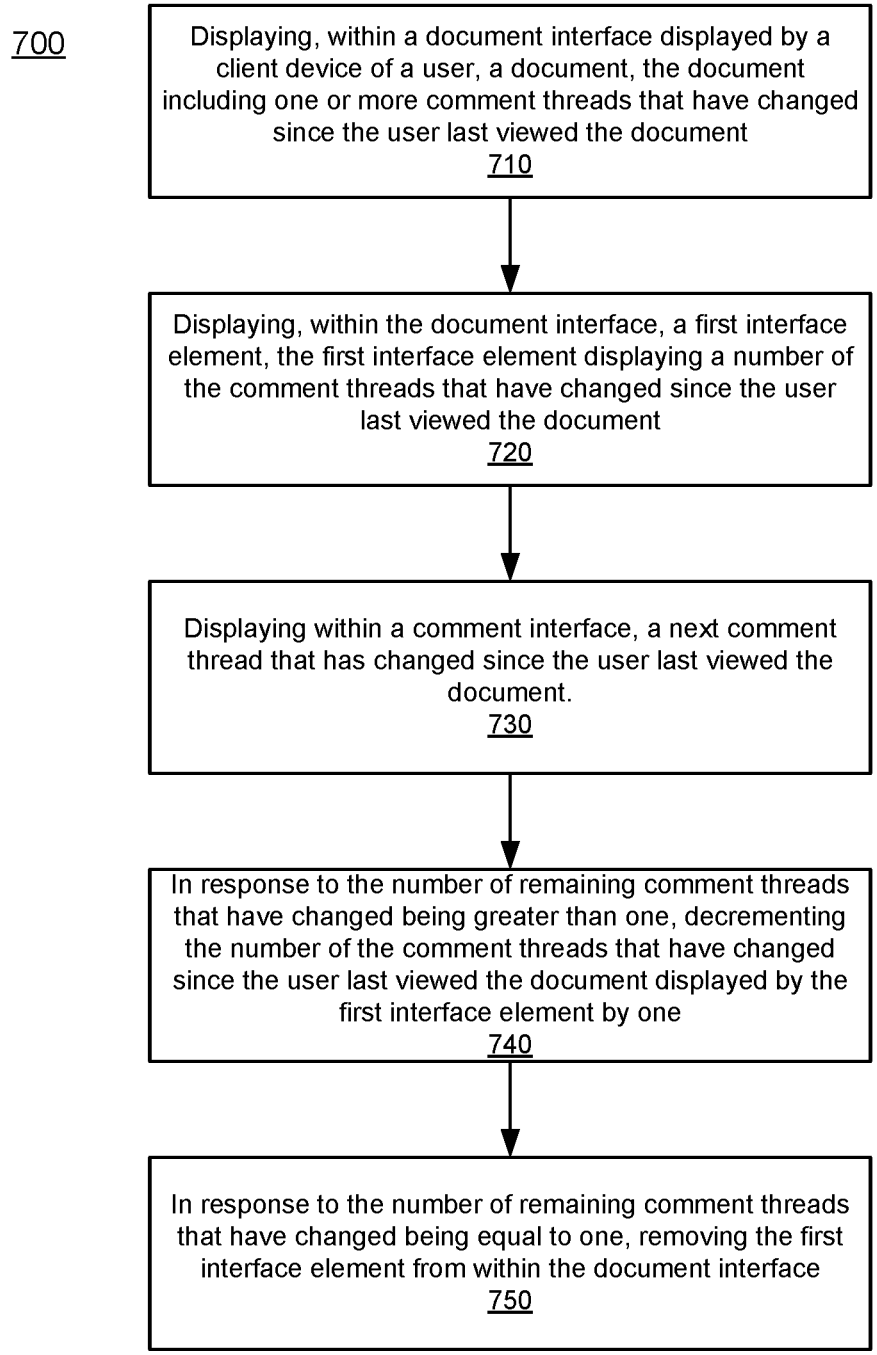
FIG. 7 is a flow chart that illustrates a process of navigating through new comments within a collaborative content item, according to example embodiments.

FIG. 7 is a flow chart that illustrates a process of navigating through new comments within a collaborative content item, according to example embodiments. A device displays 710 a document within a document interface 500 displayed by a client device of a user, the document including one or more comment threads that have changed since the user last viewed the document. The device displays 720 a first interface element within the document interface 500, the first interface element displaying a number of the comment threads that have changed since the user last viewed the document. When the first interface elements is interacted with, the device displays 730 a next comment thread that has changed since the user last viewed the document within a comment interface. In response to the number of remaining comment threads that have changed since a user last viewed the document being greater than one, the number of the comment threads that have changed since the user last viewed the document displayed within the first interface element is decremented 740 by one. In response to the number of remaining comment threads that have changed since a user last viewed the document being equal to one, the first interface element, when interacted with, is removed 750 from within the document interface 500.

Figure 8:
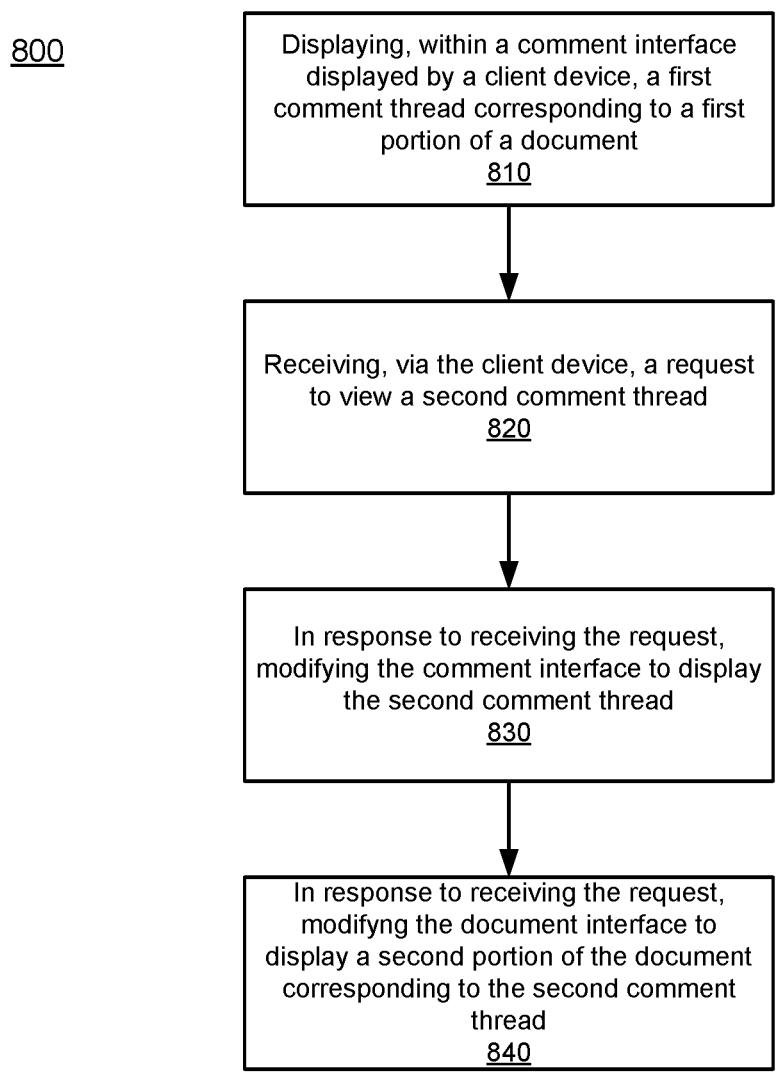
FIG. 8 is a flow chart that illustrates a process of navigating through comment threads, according to example embodiments.

FIG. 8 is a flow chart that illustrates a process of navigating through comment threads, according to example embodiments. A device displays 810, within a comment interface displayed by a client device, a first comment thread corresponding to a first portion of a document. The device receives 820, via the client device, a request to view a second comment thread 820. In response to receiving the request, the device modifies 830 the comment interface to display the second comment thread. In response to receiving the request, the device also modifies 840 the document interface 500 to display a second portion of the document corresponding to the second comment thread.

Notification Interface

When a user with access to a collaborative content item stored by a content management system comments within or otherwise contributes to a comment thread stored by the content management system, the content management system detects the activity and updates the comment thread to reflect the activity. For instance, if the user comments within the comment thread, the content management system updates the stored comment thread to include the text of the user's comment. Likewise, if the user adds an image to the comment thread, the content management system stores the image in conjunction with the updated comment thread. When another user subsequently views the comment thread, the updated comment thread (including the added comment, image, etc.) is visible. Accordingly, as noted above, comment threads can enable communication and collaboration between users in conjunction with a collaborative content item.

Upon detecting activity within a comment thread, the content management system can generate a notification in response to the detected activity, and can provide the generated notification to one or more client devices associated with users with access to the collaborative content item for display within a notification interface. The notification can identify the corresponding document, the identity of users associated with the detected activity, the portion of the document associated within the comment thread, and the like. The notification can thus enable a user to quickly identify a change to comment thread content without requiring the user to access the entire document, to search through the document to locate the comment thread, and to determine if content of the comment thread has changed.

Figure 9A:
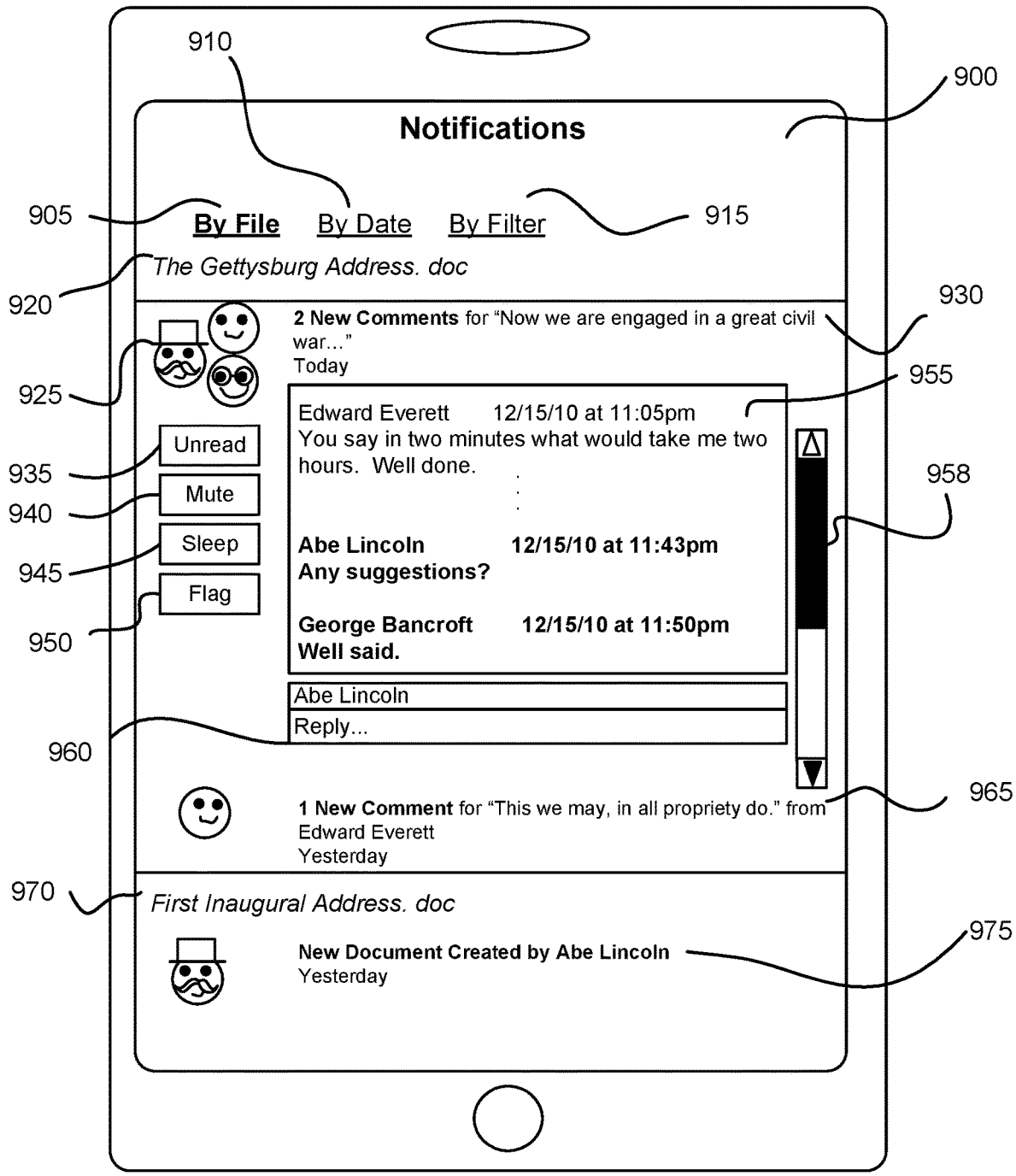
FIGS. 9A through 9C illustrate comment thread management via a notification interface, according to example embodiments.
Figure 9B:
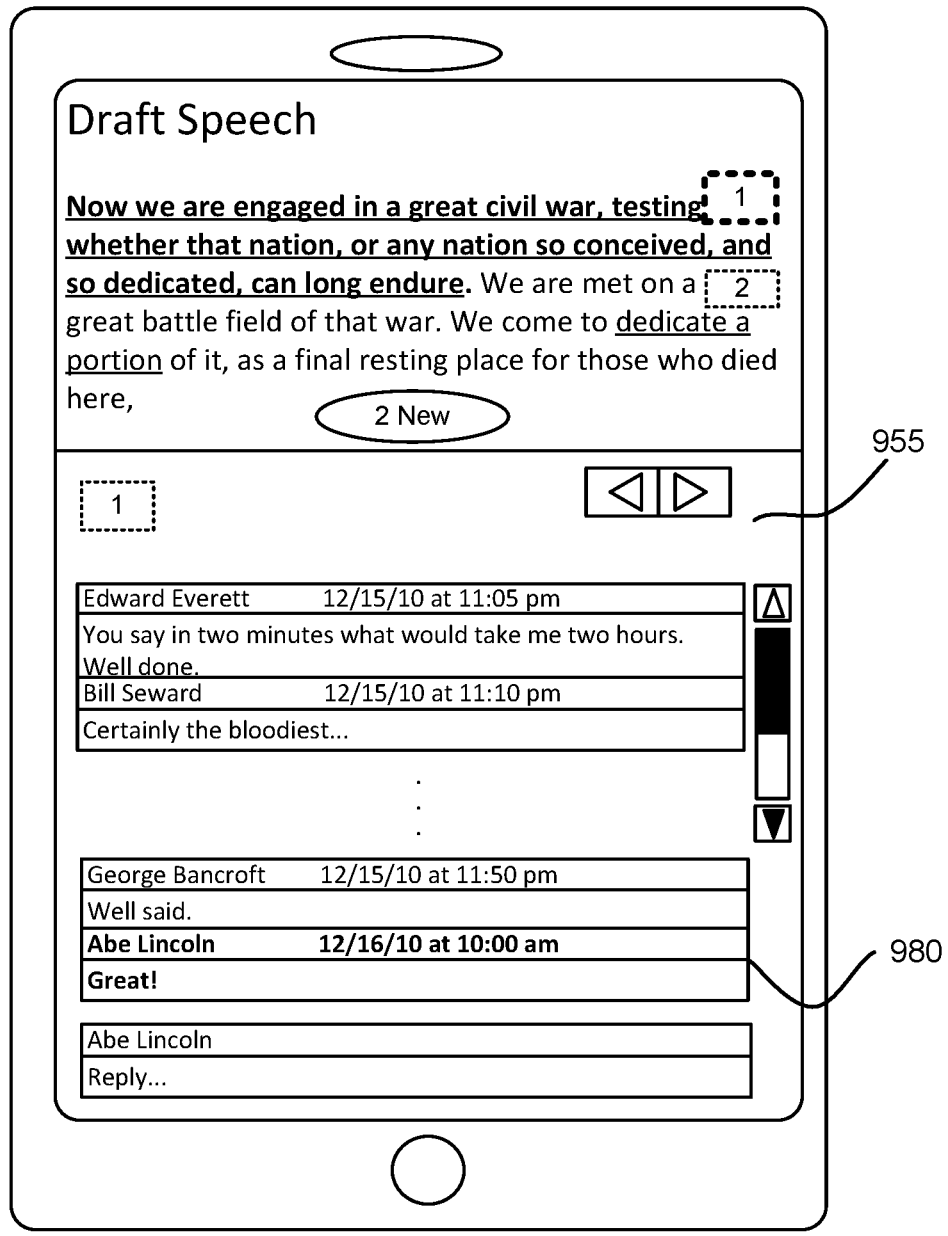
Figure 9C:
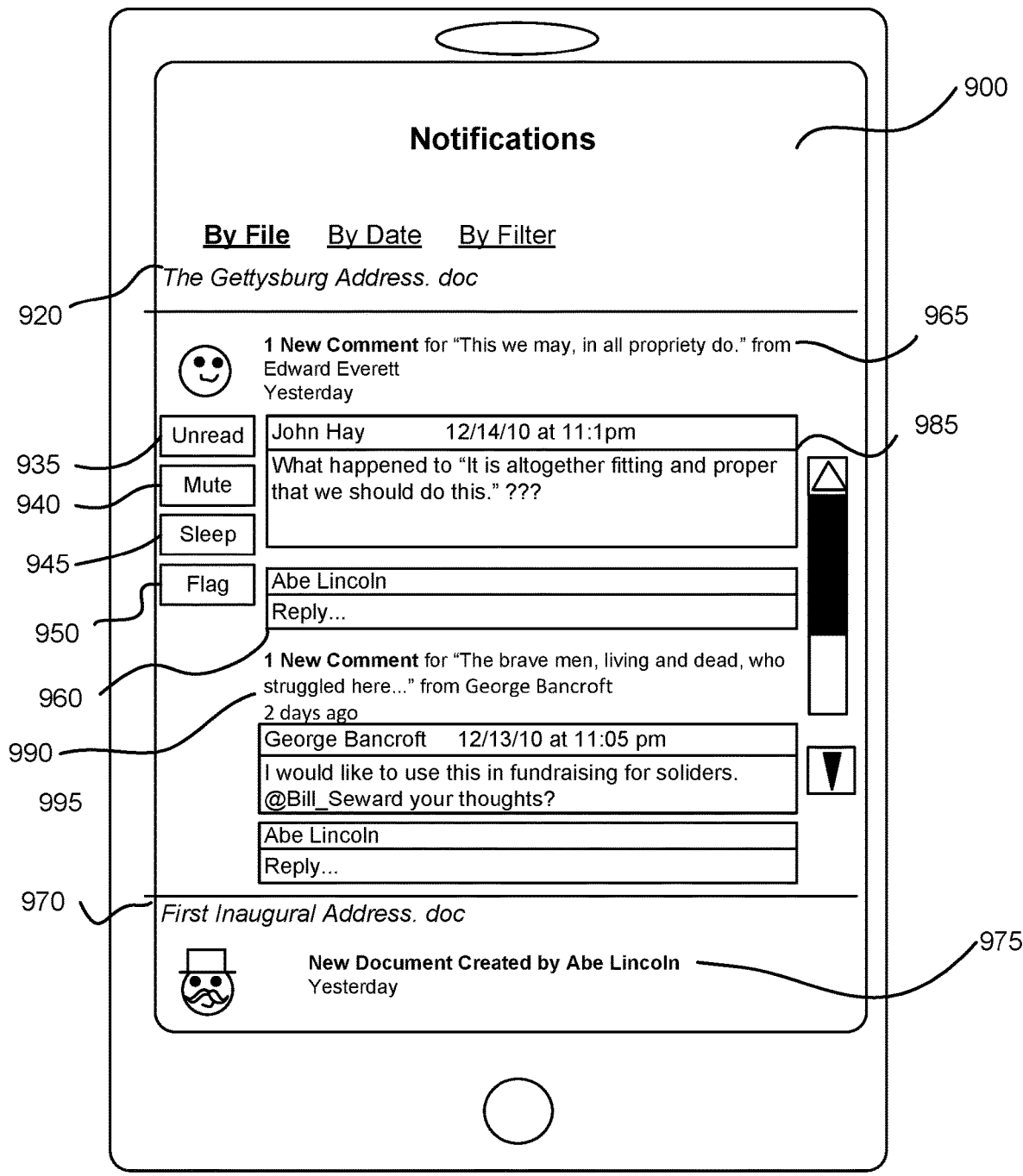

FIGS. 9A through 9C illustrate comment thread management via a notification interface, according to example embodiments.

FIG. 9A illustrates a notification interface 900 of a client device, according to example embodiments. The notification interface 900 displays notifications for a first document 920 (i.e., "The Gettysburg Address.doc") and a second document 970 (i.e., "First Inaugural Address.doc") stored by a content management system 100. The notifications may be sorted and organized by file 905, by date 910, by filter 915, or by other suitable organization methods. In some embodiments, the notification interface 900 is a mobile device operating system notification interface, and may present additional notifications associated with activities within applications unrelated to the content management system 100 stored on the client device (e.g., messaging applications, social media applications, mobile device updates). In other embodiments, the notification interface 900 is an interface displayed by a native application of the client device associated with a content management system 100 and only displays notifications related to activity within the documents stored by the content management system 100.

In the example shown in FIG. 9A, the notifications are organized by file 905. In some embodiments, the client device detects activities in the documents stored in the content management system 100 and generates a pull notification for each detected activity. For example, the first notification 930 of the first document 920 identifies the detected activity (i.e., "2 New Comments"), identifies the portion of the document associated with the first notification 930 (i.e., "Now we are engaged in a great civil war . . . "), and includes the associated comment thread 955. As shown in FIG. 9A, the two new comments are distinguished from older comments in the comment thread 955 by a bold font. In other embodiments, other visual indicators such as colored fonts, highlights, letters that fade over time, and markers may be used to distinguish new comments from older comments. In the first notification 975 associated with the second document 970, the document is identified and the activity associated with the document (i.e., the creation of the document by user Abe Lincoln) is displayed. It should be noted that in addition to pull notifications, the content management system can detect activity within stored documents and can generate push notifications for each detected activity that are provided to one or more client devices for display within a notification interface.

The comment thread 955 of the first notification 930 has three participating users: Edward Everett, Abe Lincoln, and George Bancroft. The participating users are represented by a facepile 925. The facepile 925 is a collection of images (e.g., profile pictures) corresponding to each of the users participating in the comment thread 955. The facepile 925 allows a viewing user to quickly identify other users that are involved with the comment thread 955 without looking through the entire comment thread 955. In some embodiments, images of users associated with new comment thread activity are distinguished. For example, the facepile 925 may be a stack of the images of users, and the images of users associated with new comment thread activity may be at the top of the facepile (on top of images of other users that are not associated with new comment thread activity), may be bigger in size than the other images, and the like.

The notification interface 900 of a client device operating system interface may include a response interface element 960 that allows users to contribute to the comment thread 955 directly from the notification interface 900 without having to access the entire document, for instance from the native application of the mobile device. By being able to respond to the comment thread 955 from the notification interface 900 of the client device, the user may quickly reply to comment thread activity after receiving a notification, potentially reducing the time and effort required to contribute to a collaborative conversation or to answer a question posed within the comment thread. When the user contributes to the comment thread via the response interface 960, the user's input is provided to the content management system 100, which is then stored by the content management system 100 within the comment thread. The input may be a textual input, an image, a sound file, a video, a chart, or any other suitable data. However, if a user instead prefers to review the comment thread 955 within the native application, the user can interact with the notification (e.g., touch a portion of the notification), and the client device can launch or display the document associated with the comment thread.

The content management system incorporates a user's input within the response interface 960 within the comment thread 930 of the document 920. For example, if a user provides a textual input to the comment thread 955 from the notification interface 930, the textual input is stored by the content management system 100 and is subsequently shown in the comment thread 955 when a user with access to the first document 920 opens the document and views the comment thread, as shown in FIG. 9B.

Referring back to FIG. 9A, the first document 920 is associated with a second notification 965 and additional notifications below the second notification 965 as indicated by the scroll bar 958. Because display space in the notification interface 900 is limited, the full comment thread associated with the second notification 965 is not displayed. The comment thread associated with the second notification 965 may be displayed when the user interacts with the scroll bar 958. For instance, the first notification 930 and comment thread 955 can roll off the notification interface 900 until there is enough display space for the comment thread associated with the second notification 965. In other embodiments, the presence of additional notifications associated with a document may be indicated by other visual indicators than the scroll bar 958.

In some embodiments, the user may not be interested in receiving notifications for all detected activities within one or more documents stored by a content management system 100. In such embodiments, the user may select the types or characteristics of notifications to receive. For instance, the notification interface 900 may include interface elements such as a button or a switch for marking a notification as read or unread 935, to mute 940 a notification, to put a notification to "sleep" 945 for a period of time, and to flag 950 a notification.

In some embodiments, a notification may be automatically removed from the notification interface 900 after a viewing user views or responds to a comment thread associated with detected new activity. In other embodiments, if a user flags a notification or makes a notification as unread even though the user has viewed or responded to a comment thread associated with detected new activity, the notification may be maintained within the notification interface 900.

In some embodiments, the user may decide that a particular comment thread is unimportant and may wish to not receive notifications when subsequent new activity associated with the comment thread is detected. In such instances, the user may interact with the mute 940 button, which prevents the user from receiving further notifications about activity associated with the comment thread. The user may also temporarily or permanently mute all notifications related to a document, a folder, a user, and a type of notification. In some embodiments, the user may wish to pause notifications from a particular comment thread, document, folder, user, or type of notification for a period of time. For example, a user may want to focus on the second document 970 in order to meet a deadline and may not want to be disturbed by notifications associated with the first document 930 until the deadline for the second document has passed. The user may interact with the sleep 945 button to pause the notifications from the first notification 930 and to identify a time period associated with the pause (e.g., 1 hr, 2 hrs, 1 day). When the user interacts with the sleep button 945, the first notification 930 may disappear from the notification interface 900 for the identified time period.

If the user of the client device displaying the notification interface 900 is following many active documents stored by the content management system 100, the user may receive many notifications. Because display space is often limited on a mobile device, it is useful to prioritize documents and such that notifications associated with high priority documents are prioritized. The user may rank documents by assigning a priority level to each (e.g., high, medium, low), providing a numerical ranking, or dragging and moving the position of documents within the notification interface 900. If the user does not provide a ranking preference, the content management system 100 may generate a ranking for the documents based on the user profile, the user's past interactions with documents, the user's past interactions with other users, folders to which documents belong, and the types of notifications, and the content management system 100 may generate a ranking for the notifications based on the ranking for the documents.

The user may also organize notifications by date 910. The notifications may be organized chronologically, and the user may identify whether to view older notifications before newer notifications or vice versa. The dates used to organize the notifications can include a document edit date, a document creation date, a new comment thread activity date, and the like.

The user may also apply one or more filters 915 to the notifications displayed within the notification interface 900. For instance, the user may filter the notifications by person, by folder, by tags, by document types, by document ownership, by date, by document authorship, by document shared status, or by activity. The user may apply one or more filtering criteria to the notifications, and the notifications that match the applied filtering criteria can be presented to the user.

FIG. 9B illustrates a modified comment thread in a native application of the mobile device, according to example embodiments. When a user provides an input to a comment thread from the notification interface 900 of FIG. 9A (e.g., by providing a textual input within the response interface 960 of FIG. 9A), the textual input is stored by the content management system 100. Using the stored textual input, the content management system 100 updates the comment thread 955 displayed in the native application displaying the first document 920.

For example, if Abe Lincoln types "Great!" into the response interface 960 in FIG. 9A, the first notification 930 of the first document 920 may disappear from the notification interface 900 of Abe Lincoln's mobile device. The other users with access to the first document may receive a notification on their mobile devices, identifying that Abe Lincoln has added a new comment to the comment thread 930. When Abe Lincoln or other users with access to the first document 920 open the first document 920 using the native application of the mobile device, the textual input 980 (e.g., "Great!") is added to the comment thread 955 and displayed within a comment thread interface of the native application (as shown in FIG. 9B).

FIG. 9C illustrates an updated notification interface 900 of a client device, according to example embodiments. In the example shown in FIG. 9C, after a user responds to the comment thread 955 from the notification interface 900, the notification 930 disappears from the notification interface 900. After the notification 930 is removed from the notification interface 900, the second notification 965 is moved up the notification interface 900 and becomes the first notification displayed within the notification interface 900. The notification 965 is expanded to include a portion of the comment thread corresponding to the notification 965 (e.g., the comment 985), and a third notification 990 is displayed within the notification interface.

Figure 10:
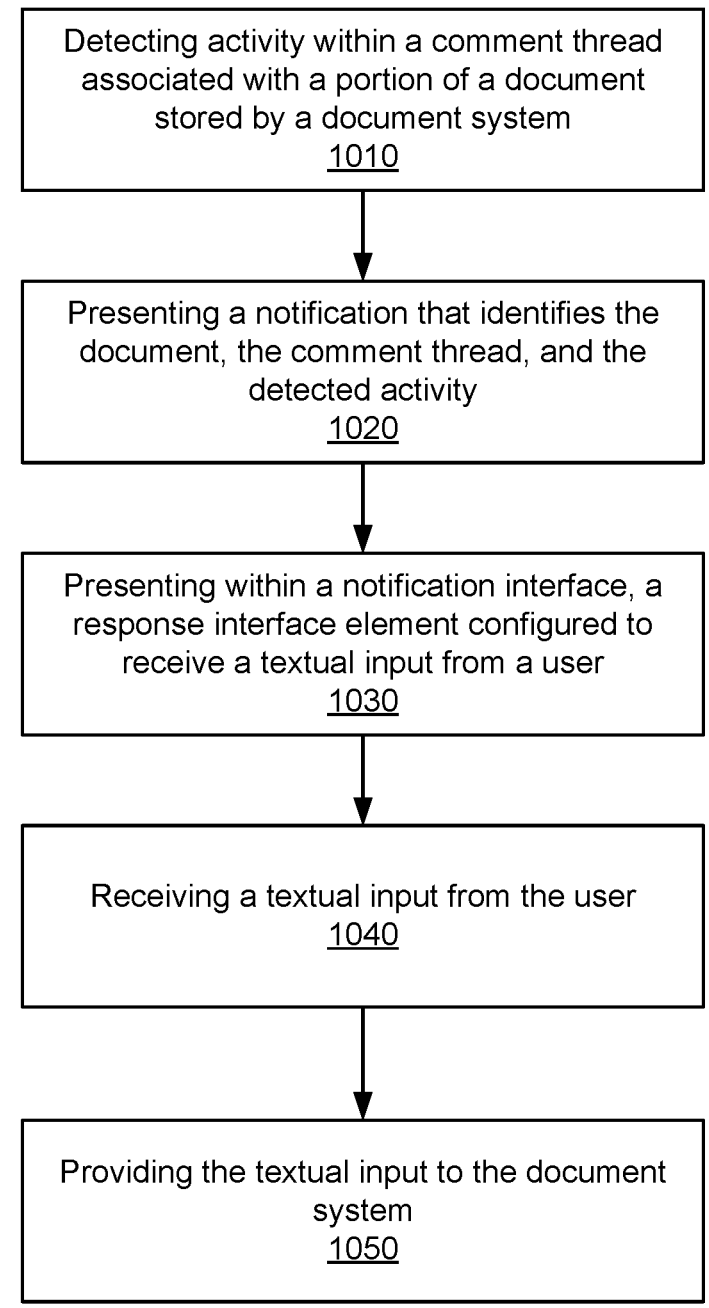
FIG. 10 is a flow chart that illustrates a process of responding to a comment thread via a notification interface, according to example embodiments.

FIG. 10 is a flow chart that illustrates a process of responding to a comment thread via a notification interface, according to example embodiments. Activity is detected 1010 within a comment thread associated with a portion of a document stored by a document system. For instance, when a user with access to the document stored by the document system comments within the comment thread, adds an image to the comment thread, or otherwise contributes to the comment thread, the activity is flagged by the document system. The flagged activity can be provided by the document system to a mobile device in response to being detected by the document system (e.g., via "push" notification) or in response to being requested by the mobile device (e.g., via "pull" notification). After the activity is detected, a mobile device presents 1020 a notification that identifies the document, the comment thread, and the detected activity. The notification may also include additional information such as identities of users associated with the comment thread and the portion of the document associated with the comment thread. The presented notification is displayed 1030 within a notification interface of the mobile device configured to receive a textual input from a user. The mobile device receives 1040 a textual input from the user via the notification interface, and the textual input is provided 1050 to the document system. The document system stores the textual input as a comment within the comment thread in the document. In some embodiments, the mobile device receives other types of input from the user, such as image data, video data, URLs, structured data, unstructured data, and the like.

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:

detecting activity, by a computing device, within a comment thread in a content item stored by a content management system, the computing device having an application installed thereon for accessing the content item, wherein the comment thread is associated with a portion of the content item;

providing instructions to present, within a notification interface of a computing device operating system interface of the computing device separate from the application that is dedicated to notifying a user of the computing device of detected activity on a plurality of applications installed on the computing device including the application and at least one additional application, a notification that identifies the detected activity, the notification interface displaying notifications associated with other content items stored by the content management system;

providing instructions to present, within the notification interface, in visual association with the notification, and concurrent with the notifications, a response interface element configured to receive input from the user of the computing device, wherein the input from the user is entered directly from the notification interface without having to access the content item from the application associated with the content item; and in response to receiving the input from the user, providing the input to the content management system, the content management system configured to store the input as a comment within the comment thread in the content item.

2. The method of claim 1, further comprising: ordering the notifications within the notification interface based on a priority set by a user of the computing device.

3. The method of claim 2, wherein the priority set by the user comprises a priority of content items stored by the content management system.

4. The method of claim 3, wherein the priority of a first document stored by the content management system is based at least in part on the priority of a folder in which the first document is stored.

5. The method of claim 1, wherein the notification further identifies one or more users that have commented within the comment thread.

6. The method of claim 5, wherein the notification identifies at least one of the one or more users by displaying an image for each of at least one of the one or more users within the notification.

7. The method of claim 1, wherein the notification further identifies the portion of the content item associated with the comment thread.

8. The method of claim 7, wherein the notification identifies the portion of the content item associated with the comment thread by including text associated with the portion of the content item within the notification.

9. The method of claim 1, wherein at least one of the notifications associated with other content items stored by the content management system is associated with one or more applications installed on the computing device different from the application for accessing the content item.

10. The method of claim 1, further comprising: receiving an interaction with the notification from the user in relation to the comment thread; and
in response to receiving the interaction, displaying the content item within the application for accessing the content item.

11. The method of claim 1, wherein the input includes at least one of a textual input, an image, a sound file, a video, or a chart.

12. The method of claim 1, wherein the content item comprises a collaboratively editable file stored by the content management system.

13. The method of claim 1, further comprising: removing the notification from the notification interface in response to receiving the input from the user.

14. The method of claim 1, further comprising: presenting, within the notification interface, a second interface element configured to, in response to an input from the user of the computing device, toggle a status of the notification between read and unread.

15. The method of claim 1, further comprising:
presenting, within the notification interface, a second interface element configured to, in response to an input from a user of the computing device, flag the notification for a later time.

16. The method of claim 1, further comprising:
presenting, within the notification interface, a second interface element configured to, in response to an input from the user of the computing device, remove the notification from the notification interface and, after passage of a period of time, re-present the notification within the notification interface.

17. The method of claim 1, further comprising:
presenting, within the notification interface, a second interface element configured to, in response to an input from the user of the computing device, mute notifications associated with the content item from the notification interface.

18. The method of claim 1, further comprising:
presenting, within the notification interface, a second interface element configured to, in response to an input from the user of the computing device, filter notifications within the notification interface based on one or more of:
users associated with the notifications, content items associated with the notifications, folders associated with the notifications, tags associated with the notifications, tasks associated with the notifications, and dates associated with the notifications.

19. A non-transitory computer-readable storage medium storing executable instructions that, when executed by a processor, cause the processor to perform steps comprising:
detecting activity, by a computing device, within a comment thread in a content item stored by a content management system, the computing device having an application installed thereon for accessing the content item, wherein the comment thread is associated with a portion of the content item;
providing instructions to present, within a notification interface of a computing device operating system interface of the computing device separate from the application that is dedicated to notifying a user of the computing device of detected activity on a plurality of applications installed on the computing device including the application and at least one additional application, a notification that identifies the detected activity, the notification interface displaying notifications associated with other content items stored by the content management system;
providing instructions to present, within the notification interface, in visual association with the notification, and concurrent with the notifications, a response interface element configured to receive input from the user of the computing device, wherein the input from the user is entered directly from the notification interface without having to access the content item from the application associated with the content item; and
in response to receiving the input from the user, providing the input to the content management system, the content management system configured to store the input as a comment within the comment thread in the content item.

20. A computing device comprising:
a non-transitory computer-readable storage medium storing executable instructions that, when executed, cause the computing device to perform steps comprising:
detecting activity within a comment thread in a content item stored by a content management system, wherein the computing device has an application installed thereon for accessing the content item, and wherein the comment thread is associated with a portion of the content item;
providing instructions to present, within a notification interface of a computing device operating system interface of the computing device separate from the application that is dedicated to notifying a user of the computing device of detected activity on a plurality of applications installed on the computing device including the application and at least one additional application, a notification that identifies the detected activity, the notification interface displaying notifications associated with other content items stored by the content management system;
providing instructions to present, within the notification interface, in visual association with the notification, and concurrent with the notifications, a response interface element configured to receive input from the user of the computing device, wherein the input from the user is entered directly from the notification interface without having to access the content item from the application associated with the content item; and in response to receiving the input from the user, providing the input to the content management system, the content management system configured to store the input as a comment within the comment thread in the content item; and a processor configured to execute the instructions.

* * * * *